Patented Oct. 23, 1923.

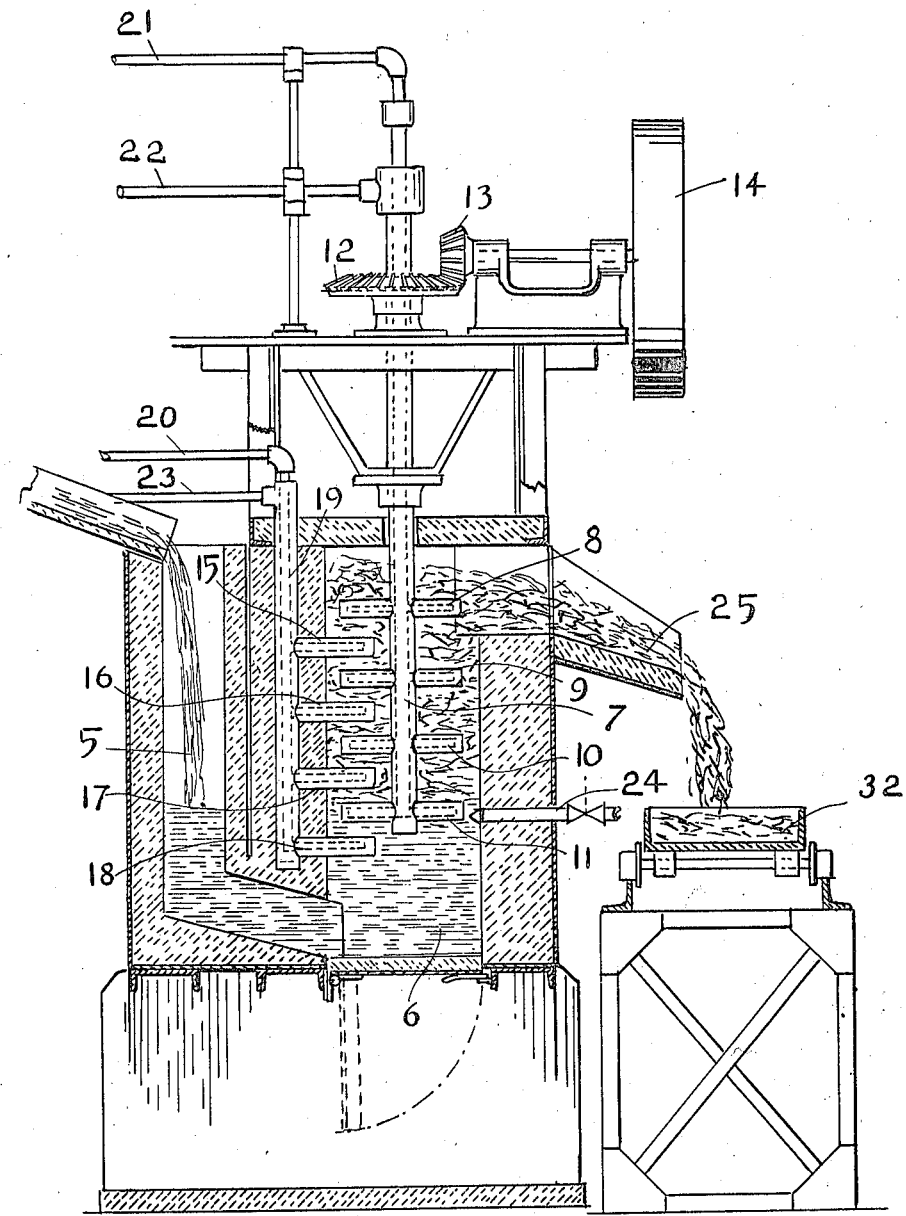

1,471,421

UNITED STATES PATENT OFFICE.

MATHIAS OVROM SEM, OF CHRISTIANIA, NORWAY, ASSIGNOR TO DET NORSKE AKTIESELSKAB ELEKTROKEMISK INDUSTRI, OF CHRISTIANIA, NORWAY, A BUSINESS ENTITY OF NORWAY.

PROCESS OF PRODUCING POROUS MATERIAL.

Application filed December 16, 1919. Serial No. 345,445.

*To all whom it may concern:*

Be it known that I, MATHIAS OVROM SEM, a subject of Norway, and a resident of the city of Christiania, Kingdom of Norway, have invented certain new and useful Improvements in Processes of Producing Porous Material, of which the following is a specification.

This invention relates to porous materials and more particularly to that type of porous materials which is used as or in the manufacture of building materials and for insulating purposes.

The object of the invention is a process whereby such materials can be manufactured from molten slags.

Various products have heretofore been produced from molten slag, such as slag-wool and granulated slag, but the product obtained according to my present invention differs from those hitherto known in that it is homogeneous and porous throughout its whole mass. It may further be cast in moulds and may consequently be produced in any desired shape.

I obtain this result by treating a molten slag with water and effecting rapidly an intimate mixture. This will result in a foam which will float on the slag and may be removed in any suitable manner and cast in moulds or cooled in other ways.

The good result which is obtained according to my invention is, I believe, due to the special treatment of the melt with water. Similar results will not be obtained by the use of steam or gases instead of water. I can, however, employ water together with steam or gases which give an effect similar to that of water alone.

I can use various raw materials for my process and the method of working will vary according to the raw materials used and the final product desired.

In the following specific illustration I give an example of the preferred way of carrying out my process reference being had to the accompanying drawing forming a part of this application in which Fig. 1 is a sectional view of the apparatus preferably employed.

In the specific example chosen for illustration I make use of a slag having the following approximate analysis:—

| | Per cent. |
|---|---|
| $SiO_2$ | 50 |
| $Al_2O_3$ | 15 |
| $CaO$ | 30 |
| $MgO$ | 5 |

I melt this slag by heating it in any commonly known suitable type of electric furnace to approximately 1400° C. I continuously lead this molten slag through a channel 5 into a container 6, which is made of refractory material capable of withstanding the slag. The container is provided with a stirrer, which consists of a double tube 7 having cross-pieces 8, 9, 10 and 11 also consisting of double tubes. The cross-pieces of the stirrer when rotated by means of bevelled gears 12 and 13 and pulley 14 will pass between similar double tube cross-pieces 15, 16, 17 and 18, mounted on a double tube 19 in the wall of the container 6. All of the double tubes are water cooled. The water is introduced through pipes 20 and 21, and leaves the system through tubes 22 and 23. The double tubes will allow the water to enter through the inner tube and return through the outer tube thus cooling the stirring apparatus. I introduce water into the container through a pipe 24 at the same time that the stirrer is rotated. The water will immediately evaporate when touching the hot slag and a foam will be formed which will rise to the top of the container 6 and continuously passes out through an overflow 25. I regulate the amount of water introduced through the pipe 24 so as to give the foam a temperature of approximately 1000° C. From the overflow 25 the foam will fall into a series of cast iron moulds 32 passing slowly under the overflow on a conveyer. The moulds will thus be filled with porous material which is gradually cooled off. It will keep the structure of the foam until after it is solidified. As a result of my process I thus obtain solid porous pieces having the shape of the mould employed. The specific gravity of my product may vary within wide limits, say from 0.7 to 0.07, but when working according to above example it will average 0.5. My product is porous all through, in which respect it differs from other products heretofore produced from molten slags and this quality imparts to my product a great insulating power on account of the numerous pores and cavities filled with air or other gases.

I can use my product either in the form of bricks or crushed to the size of coke. In the latter case it is suitable for use as a filling material in walls and the like.

The above example has been given for clearness of understanding only and no undue limitation should be deduced therefrom; but the appended claims should be construed as broadly as permissible in view of the prior art.

What I claim as new and desire to secure by Letters Patent of the United States is:

1. The process of producing a porous material from molten slag, which comprises introducing water therein and rapidly forming an intimate mixture whereby a foam is produced, removing the foam in a liquid state and cooling the same to solidification whereby the foam structure is preserved.

2. The process of producing a porous material from molten slag, which comprises continuously leading the molten slag into a container and introducing water therein, subjecting the molten slag and the water to agitation whereby a foam is produced, removing the foam in a liquid state and cooling the same to solidification whereby the foam structure is preserved.

3. The process of producing a porous material from molten slag, which comprises continuously leading the molten slag into a container and introducing water therein, subjecting the molten slag and the water to agitation whereby a foam is produced, continuously leading the foam in a liquid state into moulds and cooling the same to solidification whereby the foam structure is preserved.

4. The process of producing a porous material from molten slag, which comprises heating the slag to approximately 1400° C., introducing water into the slag thus heated and rapidly forming an intimate mixture whereby a foam is produced, the introduction of the water being regulated in such manner that the temperature of the foam will be approximately 1000° C., removing the foam and cooling the same to solidification whereby the foam structure is preserved.

5. The process of producing a porous material from molten slag, which comprises continuously leading the molten slag into a container at a temperature of approximately 1400° C., introducing water therein, subjecting the molten slag and the water to agitation whereby a foam is produced, the introduction of the water being regulated in such manner that the temperature of the foam will be approximately 1000° C., continuously leading the foam into moulds and cooling the same to solidification whereby the foam structure is preserved.

6. The process of producing a porous material from molten slag, which comprises introducing water and a gas therein and rapidly forming an intimate mixture whereby a foam is produced, removing the foam in a liquid state and cooling the same to solidification whereby the foam structure is preserved.

7. The process of producing a porous material from molten slag, which comprises continuously leading the molten slag into a container and introducing water and a gas therein, subjecting the molten slag and the water to agitation whereby a foam is produced, continuously leading the foam in a liquid state into moulds and cooling the same to solidification whereby the foam structure is preserved.

8. The process of producing a porous material from molten slag, which comprises continuously leading the molten slag into a container at a temperature of approximately 1400° C., introducing water and a gas therein, subjecting the molten slag and the water to agitation whereby a foam is produced, the introduction of the water being regulated in such manner that the temperature of the foam will be approximately 1000° C., continuously leading the foam into moulds and cooling the same to solidification whereby the foam structure is preserved.

Signed at Christiania, Norway, this 23rd day of December 1919.

MATHIAS OVROM SEM.